(12) United States Patent
Viernickel (10) Patent No.: US 8,434,554 B2
(45) Date of Patent: May 7, 2013

(54) GROUNDWATER WELL

(75) Inventor: Michael Viernickel, Berlin (DE)

(73) Assignee: Geon-En Energy Technologies GmbH, Berlin (DE)

( * ) Notice: Subject to any disclaimer, the term of this patent is extended or adjusted under 35 U.S.C. 154(b) by 419 days.

(21) Appl. No.: 12/679,956

(22) PCT Filed: Sep. 22, 2008

(86) PCT No.: PCT/EP2008/008210
§ 371 (c)(1),
(2), (4) Date: Jul. 6, 2010

(87) PCT Pub. No.: WO2009/043548
PCT Pub. Date: Apr. 9, 2009

(65) Prior Publication Data
US 2011/0198054 A1     Aug. 18, 2011

(30) Foreign Application Priority Data
Sep. 28, 2007 (DE) .......................... 10 2007 047 550

(51) Int. Cl.
*E21B 36/00* (2006.01)
(52) U.S. Cl.
USPC ............................. 166/302; 166/278; 166/62
(58) Field of Classification Search .................. 166/278, 166/302, 306, 57, 62; 165/45; 60/641.1, 60/641.2, 641.3
See application file for complete search history.

(56) References Cited

U.S. PATENT DOCUMENTS

| 2,905,245 | A | | 9/1959 | De Priester | |
|---|---|---|---|---|---|
| 3,786,858 | A | * | 1/1974 | Potter et al. | ..................... 165/45 |
| 3,938,592 | A | | 2/1976 | Aladiev et al. | |
| 4,030,549 | A | * | 6/1977 | Bouck | ........................ 166/280.1 |

(Continued)

FOREIGN PATENT DOCUMENTS

| DE | 10 2004 023428 A1 | 12/2005 |
|---|---|---|
| DE | 10 2005 045807 A1 | 3/2007 |

(Continued)

OTHER PUBLICATIONS

Office Action issued in U.S. Appl. No. 12/679,984 on Dec. 21, 2011.

(Continued)

*Primary Examiner* — Daniel P Stephenson
(74) *Attorney, Agent, or Firm* — Joyce von Natzmer; Agris & Von Natzmer LLP (57) ABSTRACT

Disclosed is an installation for using geothermal energy, comprising a main pipe (20) in a borehole (10) of a well. The main pipe (20) has several through-holes (23) to the surroundings and is subdivided into a top and a bottom section by means of a transverse closure (21) that has an opening in which a device or a part of a device (22) generating and/or promoting a flow is disposed. At least one heat-utilizing device (30) is arranged within the main pipe (20) which is surrounded at least in the region of the through-holes (23), preferably everywhere, by a porous bed (11) filing at least some of the remaining hollow space of the borehole (10) around the main pipe (20). The porous bed (11) is hydraulically interrupted within the main pipe (20) by a sealing material (12) at the level of the transverse closure (21). Said installation is used for delivering or dissipating heat, decontaminating especially groundwater, and/or generating power.

26 Claims, 3 Drawing Sheets

U.S. PATENT DOCUMENTS

| | | | |
|---|---|---|---|
| 4,047,093 A | | 9/1977 | Levoy |
| 4,101,474 A | * | 7/1978 | Copeland et al. ............. 523/131 |
| 4,201,060 A | * | 5/1980 | Outmans ...................... 60/641.2 |
| 4,448,237 A | | 5/1984 | Riley |
| 4,452,303 A | | 6/1984 | Bontje et al. |
| 4,642,987 A | * | 2/1987 | Csorba et al. ................ 60/641.2 |
| 4,694,905 A | | 9/1987 | Armbruster |
| 5,322,115 A | | 6/1994 | Hildebrand |
| 5,425,598 A | | 6/1995 | Pennington |
| 5,515,679 A | * | 5/1996 | Shulman ...................... 60/641.2 |
| 5,676,208 A | * | 10/1997 | Finley ........................... 166/278 |
| 7,082,779 B2 | | 8/2006 | Xu |
| 2002/0036173 A1 | * | 3/2002 | Feke et al. .................... 210/748 |
| 2002/0141827 A1 | | 10/2002 | Breeding |
| 2003/0010652 A1 | | 1/2003 | Hunt |
| 2007/0151591 A1 | * | 7/2007 | Jeffryes ....................... 136/240 |
| 2008/0073058 A1 | * | 3/2008 | Ueyama ......................... 165/45 |
| 2009/0056221 A1 | * | 3/2009 | Ramsey et al. ................ 47/59 R |
| 2010/0319347 A1 | * | 12/2010 | Viernickel .................... 60/641.2 |
| 2011/0232858 A1 | * | 9/2011 | Hara ............................... 165/45 |

FOREIGN PATENT DOCUMENTS

| | | | |
|---|---|---|---|
| JP | 58 024762 | | 2/1983 |
| JP | 58193053 A | | 10/1983 |
| JP | 61011567 A | * | 1/1986 |
| NL | 1014146 C | | 1/2000 |
| SU | 800513 B | * | 1/1981 |
| WO | 85/03994 A1 | | 9/1985 |
| WO | 9000707 | | 1/1990 |
| WO | 9530863 | | 11/1995 |

OTHER PUBLICATIONS

Office Action issued in U.S. Appl. No. 12/679,984 on Jun. 13, 2012.
Notice of Allowance issued in U.S. Appl. No. 12/679,984 on Sep. 21, 2012.

* cited by examiner

GROUNDWATER WELL

This is the U.S. national stage of International application no. PCT/2008/008210, filed Sep. 22, 2008 designating the United States and claiming priority to German application no. DE102007047550.2, filed Sep. 28, 2007, which is incorporated herein by reference.

FIELD OF THE INVENTION

The invention relates to a system for utilizing geothermal heat and to the use of said system for the supply or dissipation of heat, for the decontamination of in particular groundwater and/or for the production of electricity.

BACKGROUND OF THE INVENTION

The utilization of geothermal heat is regarded as belonging to the regenerative energies. The temperature rises with increasing depth. This increase in temperature is not dependent on seasons or climate, but solely depends on geological and geothermal conditions. For this reason, the utilization of geothermal heat for energy production is a good option in many regions because emission-neutral, especially with respect to $CO_2$ emissions, and safe production of energy is possible in this way.

Various systems and processes for the utilization of geothermal heat are known from the prior art. The most widely used method of utilization involves a geothermal heat probe, such as disclosed in DE 29 35 832 A1. Therein, a U-pipe is introduced in a borehole in the soil. A liquid circulating in the tube absorbs heat from the environment in the depths, which heat is subsequently utilized. A pump is provided to support circulation. This solution is disadvantageous in that the efficiency and performance of the system are limited for constructional reasons.

Groundwater offers another possible way of utilizing geothermal heat by conveying the groundwater through an extraction well to the surface where heat is withdrawn therefrom by means of a heat pump. The water is subsequently fed back into the aquifer through an injection well. This solution is disadvantageous in that the extraction of groundwater requires permission for which fees must be paid, reinjection involves monitoring obligations, and depression or rise of the groundwater table results each time. The chemical and physical parameters of water withdrawn from the extraction well frequently differ from those in injection wells just a few meters away so that chemical reactions and precipitation reactions take place, blocking the well in the long run. In addition, the pressure differences occurring during aboveground pumping involve the risk of out-gassing of dissolved gases and precipitation reactions associated therewith.

EP 0 386 176 B1 discloses a system for exchanging energy between the soil and an energy exchanger via a combination of a forward pipe with a pump in the borehole and a feedback pipe. The borehole is provided with a porous filling, and water is introduced into the borehole through the forward pipe to reach the feedback pipes through the porous filling. The feedback pipes are provided with a combination of transverse seals and through-openings in the direction of the porous filling so that the water, when conveyed to the surface, is always forced to leave the feedback pipe. The special configuration of the feedback pipes is intended to increase the heat absorption of the water. This solution is disadvantageous in that implementation thereof with sufficient efficiency is only possible over long lengths.

EP 0 755 497 B1 discloses a system for extracting geothermal heat, wherein water is introduced down to the bottom of the bore in the outer region of the borehole. A shroud pipe is arranged at a defined distance to the bottom of the bore, which pipe has a pump in the lower region thereof, the pump being intended to convey water to the soil surface. The region of the bore between the outlet opening of the water-supplying pipes and the lateral opening of the shroud pipe is provided with a porous filling. Although the inventive measures of EP 0 755 497 B1 are intended to take up preferably warm water from the lower region of the bore, the existence of a hydraulic connection between supplying and discharging pipes is disadvantageous, so that preferably cold water is conveyed to the surface which has previously been introduced into the borehole. As a result, the efficiency decreases considerably.

Other prior art systems have been described in EP 1 388 717, JP 58024762, U.S. Pat. No. 3,938,592, DE 20 2004 016 998, DE 2850865 and CH 653120.

EP 1 388 717 discloses a system for utilizing geothermal heat, which system has a main pipe divided into an upper part and a lower part by a transverse seal. The pipe has through-openings towards the surroundings. The pipe has a pump arranged therein which conveys groundwater upwards through heat exchanger pipes. Pipes are arranged in the main pipe for circulation of a heat carrier. This invention requires large bore calibers and does not provide elastic and hydraulically advantageous embedding in porous material.

JP 58024762 describes a method for extracting geothermal heat using a main pipe provided with through-openings upstream and downstream of a transverse seal. Therein, withdrawal from a groundwater-bearing layer and introduction into a hydraulically separated, different aquifer have been depicted as being essential and fundamentally necessary. This results in mixing of different groundwaters usually having different chemical and physical water qualities, e.g. bearing freshwater and saltwater, which may give rise to precipitation reactions and blocking of the well filter sections in the long run. Also, mixing of different groundwaters is prohibited in most regions for groundwater protective and ecological reasons and involves problems in regions with groundwater utilization for drinking water production.

U.S. Pat. No. 3,938,592 discloses a system for utilizing geothermal heat, which system has a main pipe divided by a transverse seal having a pump arranged therein. A U-shaped water exchange pipe for circulation of a heat carrier is arranged upstream of the transverse seal, the main pipe being surrounded by a porous bed. The installation requires relatively large underground hollow spaces through multiple drillings or blastings and is therefore not applicable in loose rock normally due to the instability of the foundation.

The disclosures of DE 20 2004 016 998, DE 2850865 and CH 653120 describe devices for the utilization of geothermal heat with a heat exchanger for direct evaporation of a liquid coolant, or they disclose main pipes or heat exchanger pipes made of PVC or polyethylene. As a result of the, at best, very slow groundwater flow, the underground closed heat exchanger surfaces will merely allow transfer capacities virtually at the level of pure conduction of heat.

Solutions known from the prior art preferably use separate pipes in the borehole to extract and return the groundwater, as well as a separate heat exchanger in the form of a separate system. As a result, the systems known from the prior art are complex and cause high expenses due to the requirement of larger bore diameters.

In particular, the problems with sealing or interaction of the main pipe with the surrounding soil have not been solved in the prior art so that prior art systems are operating with insufficient efficiency.

SUMMARY OF THE INVENTION

The object of the invention was therefore to provide a system that does not exhibit the disadvantages of the prior art and allows efficient utilization of geothermal heat. The object of the invention is solved through the features of the claims, and advantageous embodiments can be inferred in particular from the subclaims.

Surprisingly, the problem according to the invention can be solved by a system for utilizing geothermal heat, which system comprises a main pipe in a bore of a well, said main pipe, which has through-openings, being divided into an upper part and a lower part by a transverse seal which has an opening having a device at least partially arranged therein that triggers, maintains, initiates and/or supports a flow, and, in addition, at least one heat exchanging body or corresponding device being arranged in the flow, said main pipe being at least partially, preferably completely, surrounded by a porous bed which at least partially surrounds the remaining, preferably entire, hollow space of the bore around the main pipe and is arranged in the region between the through-openings of the main pipe, which are designed in the form of filter sections towards the surroundings, said porous bed being completely or partially hydraulically interrupted by a sealing material, preferably swellable clays, cement or comparable, preferably permanently flexible materials. The system or device according to the invention has the above-mentioned transverse seal preferably half-way up the surrounding loose rock saturated with groundwater. It is of course also possible to have the transverse seal positioned in the lower or upper third, quarter, sixth, eighth, or in a completely different way, which in particular depends on the hydraulic properties of the surrounding loose rock saturated with groundwater. Without any inventive effort, a person skilled in the art can determine a suitable position by assessing the hydraulic properties of the loose sediment and taking account thereof in a thermohydraulic numerical (flow) simulation. The transverse seal may also be a block of material arranged around the main pipe or traversing the main pipe. If the transverse seal is placed outside around the main pipe, the main pipe has a device or features inside making sure that the inflowing groundwater passes e.g. the pump or any other device that initiates or causes flow. Accordingly, the sealing material and the transverse seal are operatively connected so as to ensure a directed flow behavior of the groundwater flowing into the main pipe at the bottom thereof. In the meaning of the invention the transverse seal and the sealing material may form a unit or may consist of two different elements. Advantageously, a main pipe is therefore mounted in a bore, which is preferably arranged centrally in the bore and, owing to the presence of the sealing material and the transverse seal, has two different filter sections situated at a distance above each other. Through the lower part of the pipe, groundwater flows in through the through-openings and reemerges into the soil at the upper part of the main pipe, i.e. above the sealing material or the transverse seal. Owing to the combination of inventive features in a particularly preferred embodiment of the invention, the groundwater will not be conveyed to the surface and the flow rates are very low so that there are few or even no precipitation reactions. Inter alia, it was surprising that the porous bed, in combination with other features of the invention, results in an improved device or improved use thereof in utilizing geothermal heat. The porous bed around the main pipe provides low, largely laminar flow rates in an optimized manner.

It was completely surprising that, opposed to the prior art direction of development, an apparatus for utilizing geothermal heat, which does not make use of hydraulically separated water-bearing layers having e.g. different pressures or different temperatures, can be used very efficiently. It has not been obvious to a person skilled in the art that water circulation could proceed within a single horizon. To date, it has been assumed in the prior art that a hydraulic short-circuit would result unless groundwaters hydraulically separated by aquicludes would be used. Aquicludes in the meaning of the invention are in particular rocky bodies or strata having low water permeability and damming properties in relation to the groundwater.

A large number of prior art devices therefore rely on hydraulically separated water-bearing layers. However, the use of well-known devices in such hydraulically separated water-bearing layers results in mixing of chemically different waters from the diverse layers, giving rise to chemical reactions and precipitation.

As has been found in investigations of groundwater-bearing layers, the hydraulic permeability of geological formations consisting of sands and gravels is not uniform in all directions. As a rule, there is rather a directed permeability which is many times higher in horizontal direction than in vertical direction. The profile of the hydraulic permeability depends on the deposition and shape of the sediments. During the development of these geological formations they have been sedimented or washed in such a way that the water would flow essentially parallel to the ground or groundwater table and a water flow would be turned or redirected in vertical direction.

This property of groundwater-bearing sediments can be utilized in the above-described technology in such a way that e.g. groundwater is pumped from the lower part of this formation and reinjected in particular at a distance of several meters thereabove. In accordance with the permeability differences mentioned above, it is observed that the water—as opposed to the pressure differences generated in this way—does not move the shortest distance top down, but travels a long circular way round the device or system, which is many times longer than the shortest distance. This causes a flow through a large volume of the aquifer, triggering a heat exchange preferably in those cases where the injected water has a temperature which differs from that of the groundwater. Using temperature and performance measurements as well as tracer techniques, it was possible to derive laws governing the levels of heat exchanger capacity achievable through the use of this technology and make them useful for the construction of such systems. It was demonstrated that the pressure differences built-up essentially vertically trigger water movement virtually solely between the extraction and injection sections, influence on the groundwater surface barely occurs, and no lateral fresh waters are involved. The circulating water remains within the constructionally addressed aquifer, invariably in the same milieu, so that no chemical reactions or physical influences, e.g. via pH shifts, have to be feared. Aquicludes situated above and/or beneath add to the seclusion of this circuit. Advantageously, the preferably hydraulic linkage to the aquifer is accomplished by the configuration of the extraction and injection sections implemented in the form of passage openings in the main pipe and by means of the surrounding porous bed. Adaptation to the surrounding soil and flow control are effected by selecting the level of permeability. This results in uniform flow without turbulences, especially through the use of preferred glass spheres as porous bed and flow-optimized passage openings in the form of peripherally widening slots preferably made of stainless steel and adjustment of the openings in such a way that higher permeability is provided at greater distances from the transverse seal both in the extraction section and injection section. Thus, the pressure build-up between the extraction and injection sections is influenced in a way so as to additionally increase long-range vertical flow.

The modern thermohydraulic flow simulation in the form of numerical computer programs, preferably forming the basis of the technical teaching presented above, advantageously serves in particular in dimensioning the porous bed surrounding the main pipe and arranging the through-openings and the aperture area thereof. In this way, it is possible to regulate the hydraulic connection to the groundwater horizon for the intended concentric vertical circulation within the groundwater horizon. Preferably as a result of the hydraulic permeability of the porous bed and pipe apertures graded in accordance with the simulation, the amount of water on the different levels is adjusted in such a way that maximum distance lateral flow through the aquifer results, and thus a local pressure balance at the same time, so that no depression cone is formed. The flow control formed in this way can prevent hydraulic short-circuit which would otherwise occur in the vicinity of the barrier layer and substantially reduce the performance in accordance with the previous state of the art. At the same time, such flow control can ensure uniform through-flow across the entire length of the filter, which is of crucial importance in minimizing the velocities encountered and the turbulences associated therewith.

The features of the invention are intended to ensure that the circulating water has sufficient time and distance for maximum heat transfer and, at the same time, particles that are present would not result in blockage of the through-openings and thus interruption of the conveying circuit. Incidentally, the design of in particular the lower through-openings in the form of filter sections additionally ensures that the pump arranged in the main pipe is not damaged by solid components.

The through-openings of the filter sections should preferably be in the form of transverse slits increasing in width from the inside to the outside, preferably 1 to 4 mm, so that no relevant acceleration of flow takes place across the depth thereof and the surrounding porous bed is easily accessible in the event of a cleaning operation from the inside to the outside, e.g. with a pressurized water jet. For example, this can be effected by a bed of filter gravel or other preferably round bodies, the diameters of which must be adjusted preferably to the surrounding loose rock, the filter openings in the main pipe and the desired hydraulic processes in accordance with the thermohydraulic numerical flow simulation. In the meaning of the invention it is especially advantageous in this embodiment if the effective pore space, or hydraulic permeability, is in a range of more than 30% and very high up to maximum uniformity of the single components of the bed material with respect to size and sphericity is present, which is effected through the preferred use of a glass bed, particularly glass spheres having a diameter of from 0.5 to 10 mm, preferably from 1.5 to 5 mm.

Most surprisingly, these glass spheres, owing to their uniform caliber, allow maximum width of the passage openings, are, surprisingly, mechanically more stable than filter gravel conventionally used in well technology, advantageously chemically neutral and very firm, and, owing to their smooth surfaces, surprisingly insensitive to adhering bacteria and dirt and easy to clean.

It is the combination of the depicted preferred features of the passage openings or through-openings, the porous bed of glass spheres and the dimensioning thereof that forms the basis for the surprising insensitivity of the device and its use to otherwise problematic precipitation reactions and blockage of groundwater systems.

Filter section in the meaning of the invention is understood to be a section wherein the medium to be filtered, preferably groundwater optionally contaminated with suspended matter and pollutants, passes through the filter. The filter section can also be divided into a plurality of filter sections through which the flow passes non-horizontally or vertically, and which are connected to each other either directly or via flow sections free of filter material. Materials such as porous beds, preferably made of glass spheres, or microfilters or membrane filters, or materials separating solid components of the water by means of pores of different sizes can be used as filter materials.

Accordingly, the teaching of the invention represents a combination wherein a plurality of elements cooperate to achieve a technical overall success. Using thermohydraulic numerical flow simulation, the solution of the technical object is accomplished by the functional interaction of the single elements of the inventive combination with the surrounding loose rock. The combined elements in the combination according to the teaching of the invention cooperate to achieve an integral goal. The integral technical success of the invention is based on the effects of the single elements which, so to speak, represent a link for the combination according to the invention. To a person of average skill in the art there was no stimulus from the prior art to have precisely the claimed elements of the inventive combination cooperate preferably within a groundwater horizon. It was completely surprising that a system for utilizing geothermal heat in an aquifer could be designed and dimensioned such that operation thereof is particularly efficient and trouble-free if the porous bed surrounding the main pipe at least partially, preferably completely, and the through-openings of the main pipe are designed in the form of filter sections preferably in accordance with the results of a thermohydraulic numerical flow simulation and have the features as claimed. These features, in combination with the transverse seal within the main pipe, thereby hydraulically interrupting the porous bed completely or partially, together with the heat-utilizing device arranged in the main pipe, result in a system which can be used for both supply and dissipation of heat. It was not obvious to a person skilled in the art that cooperation of the claimed components in accordance with the system of the invention would furnish particularly good results in the supply or dissipation of heat over a long period of time. A distance between the extraction and injection sites of groundwater utilized for heat exchange of more than three times of the implementation recommended herein has been regarded as indispensable.

The teaching according to the present application is remarkable for the following features:

Departure from conventional technologies: while up to now at least two wells at a distance of at least 15 meters were found to be necessary for efficient heat exchange with the groundwater, the use of the present invention, applying modern numerical thermohydraulic simulation procedures, allows vertical stacking of these wells within a single bore, wherein a distance of significantly less than 10 meters of the main pipe passage openings in the form of filter sections has to be met.

New field of problems: the combination of elastic heat exchanger pipes preferably made of e.g. polyethylene or stainless steel allows low-cost installation easy to accomplish, which can be dismantled with similar ease, e.g. for maintenance purposes, and allows high heat exchanger performance without extracting potentially aggressive waters in sensitive user structures.

Existence of a long-unsatisfied, urgent need for the solution of the problem solved by the invention: particularly in urban areas and similarly restricted places, high-performance utilization of geothermal energy has not been feasible as yet, but is now possible with the present invention even in economic terms.

Hitherto vain efforts in the art: optimizing the heat transfer in conventional probe system has reached the end of its potential in the prior art, the surrounding soil restricts heat transport so that higher performance is only possible through multiple installations. Extraction and injection of groundwater has regularly resulted in problems during injection so that this technology is used only under few circumstances.

Simplicity of a particular solution indicates inventive activity, especially as it replaces more complicated teachings: the mere movement of naturally occurring groundwater below the groundwater table mobilizes the heat potential of a large area of influence and seasonal thermal regeneration, the induced vertical circulation allows extensive collection of thermal energy with only minor changes in temperature and without the problems triggered by oxygen contact or changes in pressure.

Development in scientific technology has proceeded in a different direction: up to now, coping with the problems of chemical reactions and precipitation reactions in well systems has been implemented by maintaining the pressure and nitrogen treatment instead of operating in a small area within a uniform chemical and physical medium in order to avoid these problems; also, the use of special filter beds and filter pipes is suitable for avoiding adherence of bacteria and other material, reduce turbulences and allow largely unrestricted access for maintenance.

Achievement that rationalizes development.

Erroneous ideas in the art on the solution of the problem at issue (prejudice): the directed hydraulic permeability of groundwater-bearing loose rock in horizontal direction is up to 10 times higher than the vertical permeability, thereby allowing utilization even of small groundwater horizons in the form of vertical through-flow in a large radius, which has previously been considered impossible, instead of installing two wells situated at a great distance from each other and inducing horizontal flow.

A technical progress is the enhancement of the heat exchanger performance achievable within a single bore, resulting in lower expense and savings of time and material during installation, enhanced reliability in operation, extensive maintenance freedom.

Fortunate choice because one has been selected, the result of which has not been predictable, this therefore being a patentable fortunate choice.

Errors in the technical literature or highly contradictory representation of the subject matter of the invention.

Only by introducing modern geothermal measuring methods and numerical thermohydraulic simulation procedures it has become possible to construct and install efficient systems with little effort, while observing the legal and technical framework conditions.

Issue of licenses.

Praise in the art.

Economic success.

In particular, the advantageous embodiments of the invention have at least one or more of the advantages mentioned above.

It was completely surprising that the combination of a main pipe which is placed in the bore of a well and has through-openings towards the surroundings in the form of filter sections, in association with at least one transverse seal in the main pipe and a device for inducing continuous or discontinuous flow drive results in an improved system for utilizing geothermal heat from the groundwater if the main pipe is assigned to at least one heat-utilizing means or operatively connected therewith and the main pipe is surrounded at least partially by a porous bed, said porous bed being interrupted by a sealing material in the region of the transverse seal inside the main pipe so that the bed is at least partially hydraulically interrupted with respect to inflowing or outflowing water. Depending on the through-area of the through-openings of the main pipe and the grain size of the porous bed, this results in a flow control with respect to volume flow, direction and distance. Without any inventive effort, a person skilled in the art can determine such dimensioning using flow simulations or routine tests.

One preferred embodiment of the system according to the invention is particularly advantageous in that the groundwater, or water, is not conveyed to the surface, but rather an underground circulation is generated. It is especially advantageous that, owing to the construction-related flow control and the hydraulic barrier, preferably in the form of a transverse seal in the bore, hydraulic short-circuits are prevented and flow through the soil body at very slow rates is effected in a large radius.

In addition, the system according to the invention is remarkable in that, in the end, only one pipe must be introduced into the bore, in combination with the special configuration and arrangement of the bed sealingly formed between the filter sections.

There are only very low, uniform, slow flow rates with laminar flow profile in the system according to the invention, thereby minimizing the occurrence of precipitation reactions of substances dissolved in the groundwater and the activity of bacteria (e.g. those oxidizing iron). Surprisingly, the inventive combination of technical features results in a minimization of bacterial activity.

Inter alia, the advantageous developments of the inventive system for utilizing thermal energy result in only minor intervention in the water budget and thus in the ecological system as a whole. The essential reason for this is that, ultimately, the groundwater is merely set in motion rather than extracted so that a system in accordance with the present invention is unproblematic with respect to official permission procedures because groundwater extraction fees and monitoring obligations in the event of reinjection are dispensable.

Advantageously, a system in accordance with the present invention causes only minor thermal influences as opposed to strong local overheating or cooling in closed (probe) systems of the prior art.

Apart from the advantages described above, the system according to the invention is easier to maintain because there are no above-ground system components that might undergo corrosion upon exposure to atmospheric oxygen. Costly corrosion-resistant designs of e.g. the heat exchangers are dispensable. Moreover, owing to its design, the construction of the system is easier because the main pipe with all of its components can be prefabricated and the system as a whole can subsequently be introduced into a borehole. Finally, it is preferably only necessary to introduce the inventive filling of the borehole with the centrally arranged sealing layer. Also, maintenance is easy to accomplish, and virtually complete inspection of a system designed in such a way, i.e. demountable and replaceable in its components, is possible.

The system according to the invention is also remarkable for a 5 to 10 times higher performance in utilizing thermal energy compared to previously known systems.

In the meaning of the invention the device that triggers or initiates flow can be e.g. an electrical or mechanical device or a combination of both. In the event of a mechanical device, a screw, an impeller or the like can be envisaged, for example, and a pump in the event of an electrical device. In a preferred fashion these devices or parts thereof are arranged in the opening of the transverse seal. Of course, it can also be envisaged to arrange the pump or vital elements of the mechanical arrangement, preferably the screw, above-ground so that only parts of these units are positioned in the opening of the transverse seal. In the meaning of the invention it should preferably be ensured that flow between the upper part and the lower part of the main pipe takes place, i.e. particularly upstream and downstream of the transverse seal which may also be referred to as sealing jacket. The use of a pump is preferred because it is inexpensive and energy-efficient, available on the market, well controllable and easily replaceable. Obviously, it is also possible to have the pump completely arranged in the opening.

The heat-utilizing means or the devices in the main pipe can be e.g. a plurality of pipes arranged in the main pipe. For example, said plurality of pipes may extend from the region of the soil surface and into the main pipe, and a heat carrier, preferably water and/or brine, circulates in the interior of the plurality of pipes.

For example, the porous bed surrounding the main pipe at least partially, preferably completely, so as to fill the remaining hollow space of the bore around the main pipe can be constituted of gravel, relatively small or large stones, detritus, as well as defined spheres. The grain size of the bed can preferably be in the range of 1 mm—e.g. in the event of fine gravel or spheres—up to a range of 20 mm, i.e. the range of coarse gravel. As is well-known to a person skilled in the relevant art, the porous bed or porous material system is constituted of a solid phase, the particles, and the interstices (hollow space). Inside the porous bed there are continuous, accessible non-continuous and closed pores. As a consequence, there are perfusable and non-perfusable porous areas. According to the present application, these perfusable porous layers are claimed, which are formed by filling sand, gravel or similar particles such as ceramics or glass. On the one hand, the porous layer is defined by its porosity and solids content. In the meaning of the invention the porosity of a respective bed is understood to be a measure for the density of the bed with its hollow spaces. Consequently, it can also be defined as relative density compared to a massive material. The overall porosity of the bed is given by the sum of hollow spaces connected with each other and with the surroundings and hollow spaces not connected with each other. The porosity of beds describes the volume of hollow spaces that can be occupied by motile, migrating media such as water and/or gas. Thus, for example, gravel has an overall porosity of up to more than 40%. It is also possible to use the term "degree of leakiness" for the overall porosity.

At the level or within the range of the transverse seal inside the main pipe the porous bed is interrupted by a sealing material, which material can be clay, for example. Mineral grains of natural origin with a grain size or an equivalent diameter of less than 20 µm, preferably less than 10 µm, more preferably less than 2 µm, are referred to as clay in the meaning of the invention. More specifically, clay in the meaning of the invention can be clay minerals comprising silicon, oxygen, hydrogen as well as magnesium and aluminum. For example, this may involve silicates or the minerals goethite or gibbsite which are not silicates. It is of course also possible to use calcium silicate with shares of aluminum and iron as sealing material for the transverse seal.

Special attention should be devoted to the design of the filter section which ensures continuous development of groundwater velocity from the periphery in loose rock to the interior space of the main pipe and must be adjusted to the surrounding geological formation in vertical and horizontal direction in its hydraulic parameters of permeability. This requires investigations of the loose rock, using core samples, and adjustment to the passage openings in the main pipe. The passage openings preferably widen outwardly, e.g. in a wedge-shaped design of the ribs between the openings, so that colmation is avoided, impairment of flow is low at maximum opening for minimum energy consumption of the circulation pump, and good access for high-pressure jet cleaning or other maintenance procedures is provided. In this way, the occurrence of whirls and turbulences is minimized which would cause premature ageing of the well. The bed material to be used represents an elastic bearing of the well casings, providing protection e.g. in the event of earthquakes and minor landslides and allowing optimum hydraulic linkage. In a preferred fashion a bed material with smooth, optionally polished, surfaces as porous filling is suitable to effect high throughput with a minimum of adhering material so that continuous distribution of coarse grains on the borehole wall up to the fine sand in the periphery is present during initial development of the well. The bed material should have sufficient mechanical and chemical stability as well as high dimensional stability of the diameters so that large passage openings in the main pipe are possible.

It is envisaged in another particularly preferred embodiment of the invention that the device inducing flow is a pump. In a preferred fashion, low-speed centrifugal well pumps with wet-rotor submersible motor in permanent-magnet technology and with well-protecting smooth start via frequency inversion are employed. Using the pump, a flow of water is conveyed from the lower region of the geological formation through the lower part into the upper part of the main pipe and reinjected from there into the groundwater horizon. Apart from the negligible pipe resistance, the pump must overcome the hydraulic resistance in the perfused aquifers. If, for example, a screw, or conveyor screw, is used instead of the pump, it will involve a shaft having one or more helically wound flights coiled thereabout, preferably in the form of flat metal sheets, rubber sheets or other selected plastics or metals or ceramics. To this end, the shaft is placed in a pipe or half-pipe. The conveyor screws can be designed in the form of rigid or flexible screws. In the event of flexible screws, the shaft will also be flexible. It is of course also possible to do without a shaft so as to provide a coreless screw, or spiral, in which event the boundaries rotate about their own curved axis. Advantageously, the stabilizing effect of the rigid shaft in this event is achieved by profiles incorporated in the spiral. If the inventive device for inducing, supporting, initiating and/or maintaining a flow is a pump, it will be used as a fluid energy machine wherein the energy inherent in the water fluid is increased by mechanical work input. The pressure of the water is increased or kinetic energy is imparted thereto, preferably for the purpose of locomotion. According to the invention, pumps also include stirrers or modified compressors or fans. In particular, the pumps can be in the form of displacement pumps or flow pumps. Of course, the pumps may also be jet pumps such as water-jet pumps, mammoth pumps, bubble pumps, hydraulic rams or horse-head pumps. If the pumps used are displacement pumps, they can be e.g. membrane pumps, rotating piston pumps, eccentric single-rotor screw pumps, impeller pumps, piston pumps, peristaltic pumps, screw displacement pumps, sinus pumps or toothed-belt pumps. If the pumps are flow pumps, they can preferably be axial pumps, diagonal pumps and/or radial pumps.

In another preferred embodiment of the invention the heat-utilizing means or device is at least one pipe or a part thereof, or a thermodynamic element for the transmission or absorption of thermal energy or for the production of electricity. If the heat-utilizing means or device is a pipe, it can be advantageous to form the pipes, which include a heat carrier, in a coaxial design. For radial arrangement of the heat exchanger pipes around the main pipe in a small gap substantially increasing heat transfer, normally 2 to 8 U-shaped stainless steel corrugated pipes with a diameter of 25-40 mm are particularly advantageous. Alternatively, it is possible to install probes with a directly evaporating coolant, or thermoelectric modules suitable for conversion into electricity, which are installed in the groundwater flow or form part of the main pipe. In another preferred embodiment of the invention the heat carriers preferably present in the pipes are e.g. water or brine. The use of brine offers the advantage of preventing ice formation at temperatures below 0° C. For example, brine in the meaning of the invention may consist of a salt solution but, due to the risk of corrosion, may also consist of a solution comprising glycols. In another preferred embodiment the device, especially the pump, induces flow upstream and/or downstream of the transverse seal. It was particularly surprising to what extent the efficiency of the system for utilizing geothermal heat can be improved when initiating a lateral directional flow upstream and downstream of the transverse seal. Owing to this procedure, the induced circulation of groundwater through the main pipe allows optimum utilization of the available groundwater heat from a large area. The groundwater flows around the heat exchanger pipes/probes arranged in the main pipe. The probes are preferably arranged below the groundwater table, and thermal energy is exchanged between in particular extracted groundwater and the heat carrier in the probes. This can also be effected in such a way that the heat carrier evaporates and subsequently ascends in such a way that heat can be withdrawn from the heat carrier above-ground.

It is envisaged in another preferred embodiment of the invention that the pipes including the heat carrier are arranged upstream or essentially upstream of the transverse seal of the main pipe. Surprisingly, arrangement upstream of the transverse seal allows especially good circulation of the groundwater in the device according to the invention. More specifically, particularly efficient inflow of groundwater via the through-openings downstream of the transverse seal is possible when the pipes including the heat carrier are arranged upstream of the transverse seal or at least essentially upstream of the transverse seal. Owing to this surprising improvement in groundwater circulation through the main pipe, the system according to the invention surprisingly has particularly low susceptibility to interference and is particularly efficient compared to prior art systems. It is possible to use smaller pipe calibers and bore diameters, the stability of the bore is increased, there is less formation of spoil/drilling material, the bore can be drilled more rapidly, resulting in time-related and financial advantages.

It is envisaged in another preferred embodiment of the invention that the pipes have a coaxial configuration. In the meaning of the present invention the pipes wherein the heat carrier circulates are also referred to as probes or heat exchanger pipes. In this context, communicating pipes or pipes having a coaxial configuration can be concerned. The probes are preferably in circular arrangement along the inner wall of the main pipe. It is particularly the coaxial configuration of the pipes that allows good absorption and transmission of the geothermal heat through the device according to the invention. Surprisingly, pipes of coaxial configuration result in an improvement of the device according to the invention in connection with the above-mentioned combinations of technical features in accordance with the main claim. The coaxial configuration of the pipes results in a particularly efficient system especially in those cases where the pipes including the heat carrier are in circular arrangement along the inner wall of the main pipe. Said coaxial configuration results in a particularly space-saving structure, and the circular arrangement along the inner wall of the main pipe results in maximum contact of the waters with the pipes, thereby allowing optimum incident flow.

It is envisaged in another preferred embodiment of the invention that the pipes including the heat carrier are designed in the form of plates having suitable cavities for water circulation. Such plates preferably have cavities arranged e.g. in the form of honeycombs through which a heat carrier can flow. Furthermore, a modular type of structure of the probes is envisaged, wherein combined use of pipes and plates is possible. According to the invention, this may involve especially plate heat exchangers. The plate heat exchangers are plate heat-transfer means and can be constituted of, for example, plates with a corrugated profile assembled in such a way that medium to be heated and medium dissipating heat alternately flow in the consecutive hollow spaces. The package of plates formed by the plates in the form of a plate heat-transfer means is preferably sealed towards the outside and between the media. Advantageously, plate heat-transfer means can be extended to good effect and are highly flexible with respect to flow configuration.

It is envisaged in another preferred embodiment of the invention that the sealing material separating the porous bed can be clay or cement or other compact materials which, advantageously, can be purchased at low cost or allow radioactive or magnetic or other labeling. Clay and clay minerals can be used synonymously in the meaning of the invention. Clay in the meaning of the invention is a main soil type of fine soil. Clay minerals according to the invention are, for example, materials comprising kaolinite, chrysotile, illite, chlorite, montmorillonite, beidellite, nontronite, saponite or others. Clay minerals are very soft, give a plastic reaction upon mechanical load and can undergo conversion into harder, solid materials upon heating, such as ceramics. Clay minerals have a large specific surface area so that substances can be adsorbed and desorbed. Advantageously, clay minerals or clays have low water permeability and can therefore be used as sealing materials in a surprisingly effective manner. Also, various types of cement are highly suitable in sealing. Cements with different chemical and physical properties, especially with respect to their sealing properties, can be produced by grinding various additives thereinto, such as metallurgical sand, pozzolana, flue ashes and/or limestone. Clay or cement is surprisingly well suited to effect hydraulic separation of the porous bed. More specifically, clay pellets can easily be incorporated as bulk material to undergo swelling within several hours to form a homogeneous, permanently flexible mass without the risk of penetrating the adjacent porous bed and thus giving rise to undesirable hydraulic sealing thereof.

Apart from water or brine heat carriers, it is envisaged in another preferred embodiment of the invention that thermoelectric or thermodynamic elements can be used in the pipes. Essentially, thermoelectric elements are components made of two different metals connected with each other at one end thereof. Thermoelectric elements are suitable in particular for the production of electricity, in which event a temperature difference is applied thereto. Various thermoelectric elements have been described in the prior art, such as Peltier elements. Peltier elements are electrothermal transducers capable of generating an electric current in the presence of a temperature difference. Such thermoelectric elements can preferably be installed in the groundwater flow or may form a component of the main pipe.

The heat exchangers are preferably arranged in the flow path between the transverse seal and the injection section, e.g. in the ascending flow in the main pipe or, e.g. in the event of great depths, in the downwardly directed flow, in which event the main pipe is designed in the form of a double pipe, preferably upstream of the transverse seal, e.g. in the form of a coaxial pipe by introducing an additional riser pipe, around which the heat exchanger pipes are arranged in the downwardly directed flow, but preferably always below the groundwater table.

In another embodiment of the invention a refrigerant which circulates in the pipes is used as heat carrier, preferably ammonia or carbon dioxide. A refrigerant is preferably a fluid which can be used in heat transfer and absorbs heat at low temperature and/or low pressure and dissipates heat at elevated temperature and/or elevated pressure, during which process the fluid usually undergoes changes of state. It is of course also possible to use a system having no pump.

In addition to ammonia and carbon dioxide, it is possible to use hydrocarbons, e.g. a hydrocarbon, fluorocarbon, fluorochlorocarbon, fluorohydrocarbon and/or fluorochlorohydrocarbon. Apart from ammonia, other preferably inorganic compounds are helium, neon, nitrogen, argon, sulfur dioxide or sulfur hexafluoride.

Preferred refrigerants having one carbon atom are, for example, tetrachloromethane, trichlorofluoromethane, tetrafluoromethane, trichloromethane, dichloromethane, chloromethane or methane. Preferred refrigerants having two carbon atoms are, for example, hexachloroethane, pentafluoroethane, trichloroethene or ethene. Preferred refrigerants having three carbon atoms are, for example, propane, propene or heptachlorofluoropropane. Also, n-butane, n-pentane, neopentane or diethyl ether or ethylamine can be used as refrigerants in the meaning of the invention. It is of course also possible to used combinations of the above-mentioned refrigerants to good effect.

In another preferred embodiment of the invention it can be envisaged to combine the heat carriers such as water or brine and/or the refrigerants in different or identical pipes. This combination, especially of pipes wherein a refrigerant circulates and pipes wherein a heat carrier such as water or brine circulates, allows particularly efficient utilization of geothermal heat.

It is envisaged in another preferred embodiment of the invention that the circulation of the heat carrier, for example water or brine, but also refrigerant, is supported at least partially by a pump. The pump is capable of inducing a circulation in the pipes. When using heat exchangers, e.g. plate heat exchangers, instead of pipes, the heat carriers are conducted through or past them. In another preferred embodiment of the invention the refrigerant used as heat carrier evaporates at low pressure and e.g. below 5° C. in the probes, is thereby driven upwardly, and dissipates the higher temperature to a heat exchanger, or is raised to a higher temperature level in a compressor, condensed in a secondary working circuit and refed at low pressure and low temperature by means of an expansion valve for evaporation. Owing to the thermally induced change of state, this involves the advantageous option of effecting circulation of the refrigerant without the use of a pump.

In another preferred embodiment of the invention the main pipe is preferably made of PVC, steel, especially stainless steel, or a combination thereof. The heat exchangers, e.g. the heat exchanger pipes in particular, can be made in particular of steel, preferably stainless steel, polyethylene or copper, or a combination of these materials. Apart from PVC, it is of course also possible to use any other thermoplastic material, especially an amorphous thermoplastic material. Apart from the polyethylene specifically mentioned, it is also possible to use other polyolefins.

The invention also relates to the use of the inventive system, especially the groundwater circulation according to the invention, for the extraction of geothermal heat, but also for the dissipation of heat and, in addition, for the decontamination of groundwater or production of electricity. Surprisingly, the system according to the invention allows combining the extraction of geothermal heat with dissipation of heat to good effect so that such a system can be used for heating or warming of buildings in the event of low ambient temperatures, e.g. during winter, and for cooling of buildings in the event of high ambient temperatures, e.g. in midsummer. No constructional modifications of the system between the different types of use are required to this end.

Accordingly, the groundwater temperature can also be used for cooling so that the system is very well suited to utilize thermal energy for withdrawing heat through direct dissipation of heat from heat carriers circulating in cooling surfaces, or as cold water set for compression air conditioning systems. Consequently, the extracted groundwater not only can be used in the utilization of geothermal heat, but it can also be envisaged in an advantageous embodiment that the extracted groundwater is used for cooling, thereby implementing seasonal heat storage in a synergistic manner and substantially increasing the possible annual heating and cooling work of the system in the long run.

Apart from extraction of geothermal heat and dissipation of heat, the system can also be used for the production of electricity without problems if, for example, thermoelectric components of the inventive device are installed or extraction from depths with temperatures of more than 100° C. for turbine operation is possible. Most surprisingly, the system according to the invention is also suitable for the decontamination of groundwater.

Likewise, the system according to the invention can be used as extraction well, or the performance thereof can be increased by partial withdrawal of the circulating groundwater.

In the context with decontamination, the systems according to the invention can initially be used for monitoring the groundwater. If, as a result of such observing or monitoring activity, amounts of substances indicating contamination are detected in the affluent groundwater, decontaminating by discharging the contaminated water is possible in addition to determining the distribution of the contaminations. The use of the system according to the invention in decontamination involves a hydraulic remediation process wherein withdrawal and infiltration preferably take place in the same borehole. In this way, lateral mobilization or dispersal of pollutants is avoided and a local cleaning effect develops, or, in the event of rapidly flowing groundwater, a barrier having a cleaning effect is erected. Depending on the pollutant, the systems for the actual decontamination can be installed underground or above-ground, and stripping processes should be specifically mentioned.

Another aspect of the invention relates to the use of the device according to the invention for the extraction of groundwater.

Accordingly, the invention also relates to the use of a device for the utilization of geothermal heat and/or for the decontamination of groundwater and/or for the production of electricity and/or for the extraction of groundwater, said system comprising a main pipe in a bore of a well, which main pipe with at least one, preferably more, through-openings towards the surroundings is divided into an upper part and a lower part by a transverse seal which has an opening wherein a device or part of a device is arranged that triggers and/or supports a flow, at least one heat-utilizing device being arranged in the main pipe, and the main pipe being at least partially, preferably completely, surrounded by a porous bed which surrounds at least a part and preferably all of the remaining hollow space of the bore around the main pipe, said porous bed being hydraulically interrupted by a sealing material in the region of the transverse seal inside the main pipe, said at least one, preferably more, through-openings being designed in the form of a filter section. The advantageous and surprising effects described for the device also apply to the use of said device.

BRIEF DESCRIPTION OF THE DRAWINGS

Without intending to be limiting, the invention will be explained in more detail with reference to the examples and figures wherein.

DESCRIPTION OF VARIOUS AND PREFERRED EMBODIMENTS OF THE INVENTION

Figure 1:
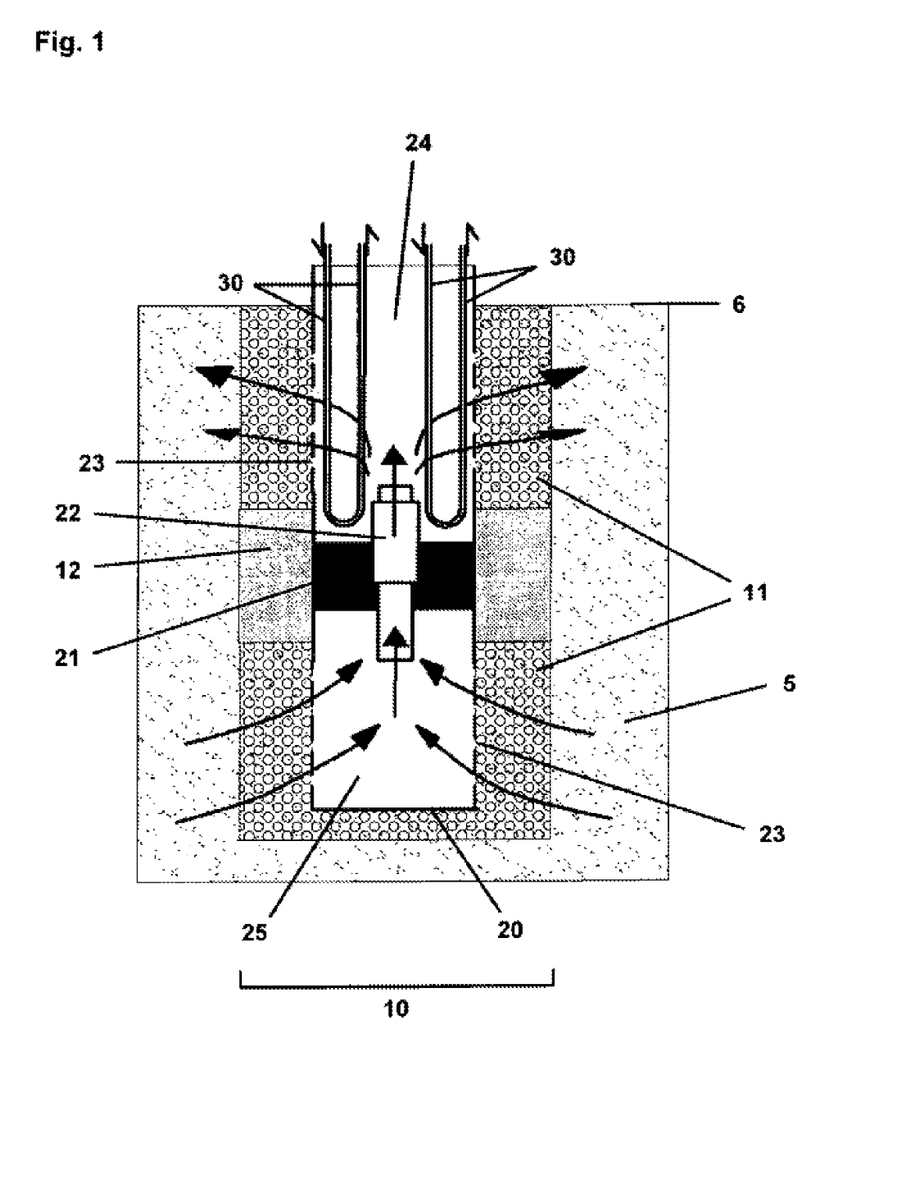
FIG. 1 is a schematic cross-section of a system with heat exchanger in the upper part.
Figure 2:
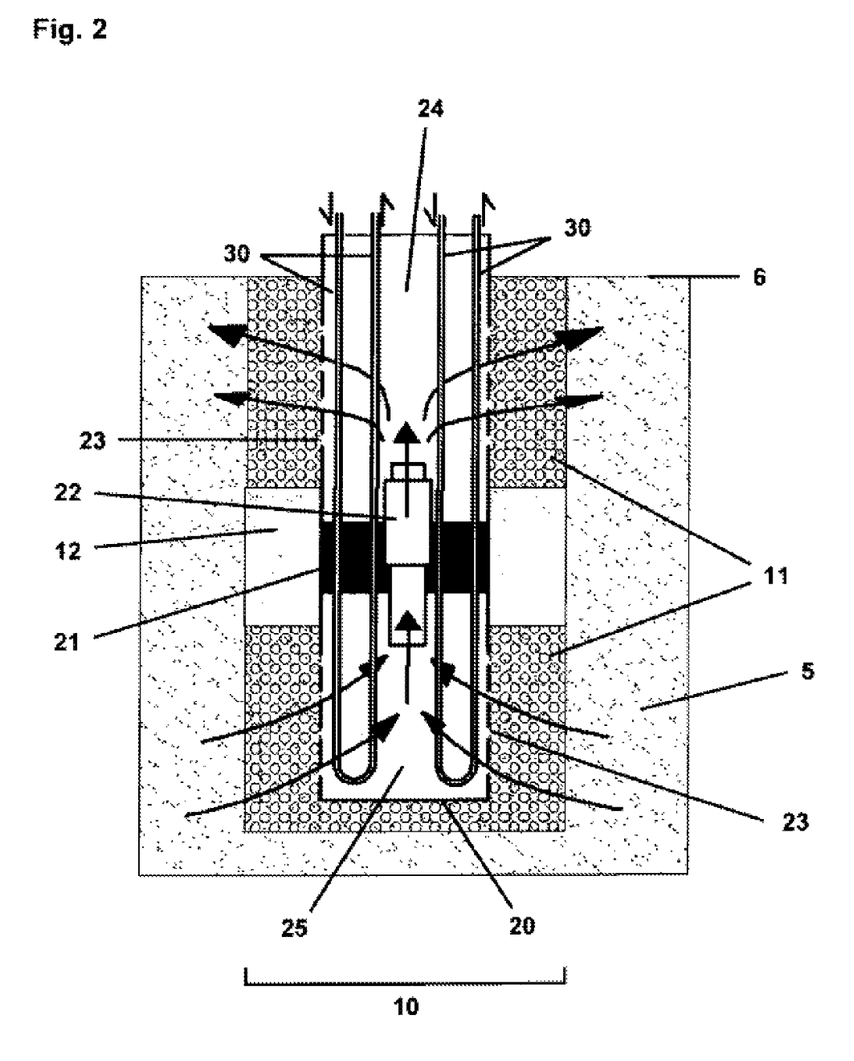
FIG. 2 is a schematic cross-section of a system with heat exchanger in the upper part and lower part.
Figure 3:
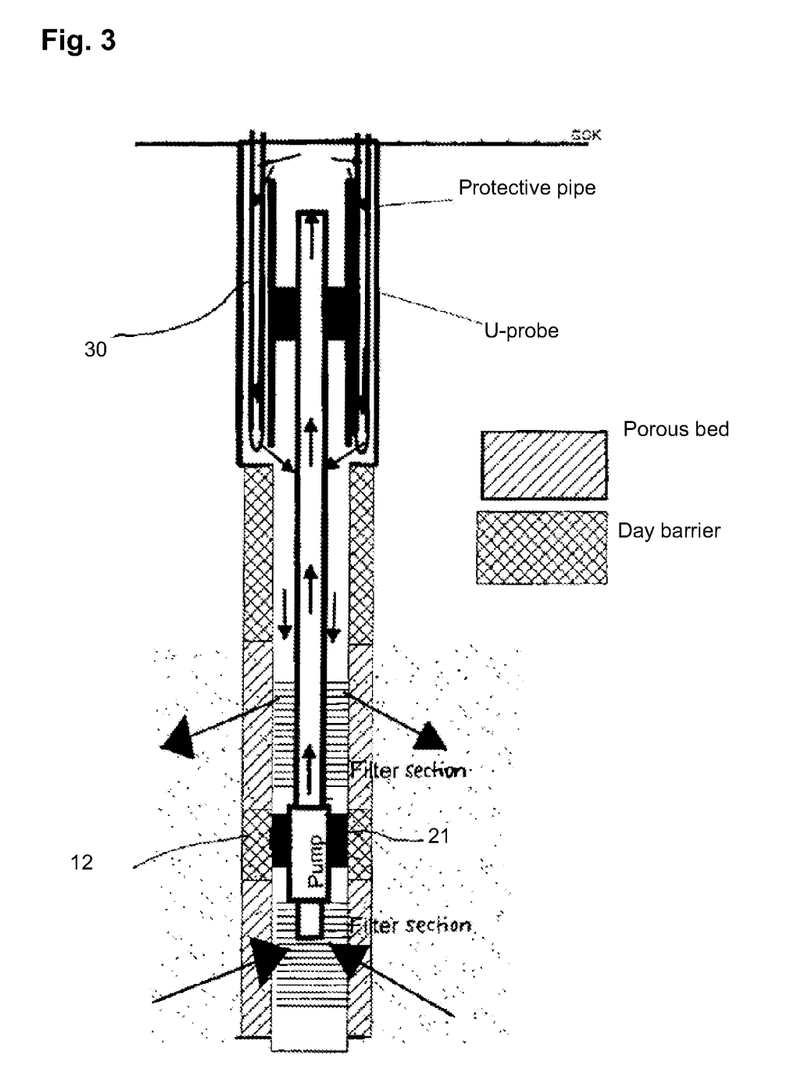
FIG. 3 is a schematic cross-section of a system with heat exchanger in the upper part.

FIGS. 1, 2 and 3 show a schematic cross-section of an inventive groundwater circulation well with heat exchanger in the upper part of the main pipe (20). A bore (10) is arranged in the soil (5), and the bore (10) ends at the soil surface (6). The main pipe (20) is arranged preferably centrally within the bore (20) and is surrounded by a porous bed (11). Preferably half-way up the loose rock bearing groundwater, the main pipe (20) has a transverse seal (21) which has an opening in the center thereof wherein a pump (22) is arranged. Owing to the transverse seal (21), upper and lower interior spaces (24, 25) are formed in the main pipe (20). In its upper and lower parts the main pipe has through-openings (23) allowing inflow of groundwater into the main pipe or outflow of water conveyed by the pump.

The pump (22) conveys the water preferably in the direction of the soil surface (6). The arrows in FIG. 1 or 2 indicate the flow direction of the water.

A sealing material (12) is incorporated in the surrounding porous bed (11) around the main pipe at the level of the transverse seal (21) inside the main pipe so that the porous bed (11) is separated into an upper part and a lower part hydraulically separated from each other. "At the level of the transverse seal" means that the porous bed is hydraulically interrupted in the region of the transverse seal, and the height or thickness of the material causing the interruption can be identical or similar to, smaller or greater than that of the transverse seal.

Pipes including heat carrier (30) are arranged in the inner space (24, 25) of the main pipe (20). According to the invention it is envisaged that the pipes with heat carrier (30) are arranged only in the upper inner space (24) of the main pipe (20), as illustrated in FIG. 1.

Furthermore, it is also envisaged according to the invention that the pipes with heat carrier (30) are conducted through the transverse seal (21) of the main pipe (20) and into the lower inner space (25) of the main pipe, as illustrated in FIG. 2.

The invention is not restricted to the embodiments illustrated in the figures. Thus, the U-shaped pipes with heat carrier (30) may also be designed in the form of plates with cavities for the through-flow of heat carrier, and the cavities are preferably designed in the form of honeycombs.

It is of course also possible to implement the invention in such a way that e.g. water-exchanging pipes are neither in the main pipe nor in the porous bed (FIG. 3).

LIST OF REFERENCE NUMBERS

5 Soil
6 Soil surface
10 Bore
11 Porous bed
12 Sealing material
20 Main pipe
21 Transverse seal
22 Pump
23 Through-opening
24 Upper interior space of main pipe
25 Lower interior space of main pipe
30 Pipe with heat carrier

The invention claimed is:

1. A system for the utilization of geothermal heat,
wherein the system comprises
a main pipe in a bore of a well,
the main pipe, having a plurality of through-openings towards the surroundings, is divided into an upper part and a lower part by a transverse seal which has an opening,
wherein a device or a part of a device is arranged that triggers and/or supports a flow, and at least one heat-utilizing device is arranged in the main pipe, and the main pipe at least in the region of the through-openings is surrounded by a porous bed which fills at least part of a remaining hollow space of the bore around the main pipe, said porous bed being hydraulically interrupted by a sealing material at a level of the transverse seal inside the main pipe, wherein the at least one heat-utilizing device is at least one pipe comprising a heat carrier and wherein the pipes are designed in form of plates with suitable cavities for circulation of the heat carrier.

2. The system according to claim 1,
wherein
at least one of the through-openings upstream and downstream of the transverse seal is in form of a filter section and/or the porous bed is a glass bed.

3. The system according to claim 2,
wherein the glass bed is a bed of glass spheres having a diameter of from 0.5 to 10 mm.

4. The system according to claim 1,
wherein the device is a pump.

5. The system according to claim 1, wherein the heat carrier is water or brine.

6. The system according to claim 1, wherein the device induces flow upstream and downstream of the transverse seal.

7. The system according to claim 1, wherein the plates are arranged upstream of the transverse seal of the main pipe.

8. The system according to claim 1, wherein the plates are arranged upstream and downstream of the transverse seal of the main pipe.

9. The system according to claim 1, wherein the plates are of coaxial design.

10. The system according to claim 1, wherein the porous material partially surrounding the main pipe is constituted of gravel, or spheres made of glass, ceramics or a comparable material.

11. The system according to claim 10, wherein the porous material partially surrounding the main pipe is constituted of spheres made of glass.

12. The system according to claim 1, wherein the through-openings of the main pipe are designed with an outwardly opening passage.

13. The system according to claim 1, wherein the through-openings of the main pipe and the porous bed are dimensioned in accordance with a flow simulation, including hydraulic properties of surrounding loose sediment, for flow control.

14. The system according to claim 1, wherein sealing material which separates the porous bed is clay or cement.

15. The system according to claim 1, wherein a refrigerant circulates as heat carrier.

16. The system according to claim 15, wherein the refrigerant is $CO_2$.

17. The system according to claim 1, wherein circulation of the heat carrier is supported by a pump.

18. The system according to claim 1, wherein the heat carrier in probes evaporates upon heating.

19. The system according to claim 1, wherein the main pipe is made of PVC, steel or a combination thereof.

20. The system according to claim 1, wherein heat exchangers provided are made of stainless steel, polyethylene or copper or a combination thereof.

21. The system according to claim 1, wherein the main pipe at least in the region of the through-openings is completely surrounded by the porous bed.

22. Method for extracting geothermal heat comprising providing a system according to claim 1, wherein said system extracts geothermal heat.

23. Method for dissipating heat comprising providing a system according to claim 1, wherein said system dissipates heat.

24. Method for decontaminating groundwater comprising providing a system according to claim 1, performing a hydraulic remediation process wherein withdrawal and infiltration take place, so that said system decontaminates groundwater.

25. Method for producing electricity comprising providing a system according claim 1, wherein said system produces electricity.

26. Method for conveying a flow of groundwater comprising providing a system according to claim 1, conveying a flow of water from the lower region of a geological formation through the lower part into the upper part of the main pipe via said pump.

* * * * *

UNITED STATES PATENT AND TRADEMARK OFFICE
CERTIFICATE OF CORRECTION

PATENT NO. : 8,434,554 B2
APPLICATION NO. : 12/679956
DATED : May 7, 2013
INVENTOR(S) : Viernickel et al.

It is certified that error appears in the above-identified patent and that said Letters Patent is hereby corrected as shown below:

On the title page, item (73) Assignee should read:

-- Geo-En Energy Technologies GmbH --.

Signed and Sealed this
Thirtieth Day of July, 2013

Teresa Stanek Rea
*Acting Director of the United States Patent and Trademark Office*